Patented Apr. 3, 1923.

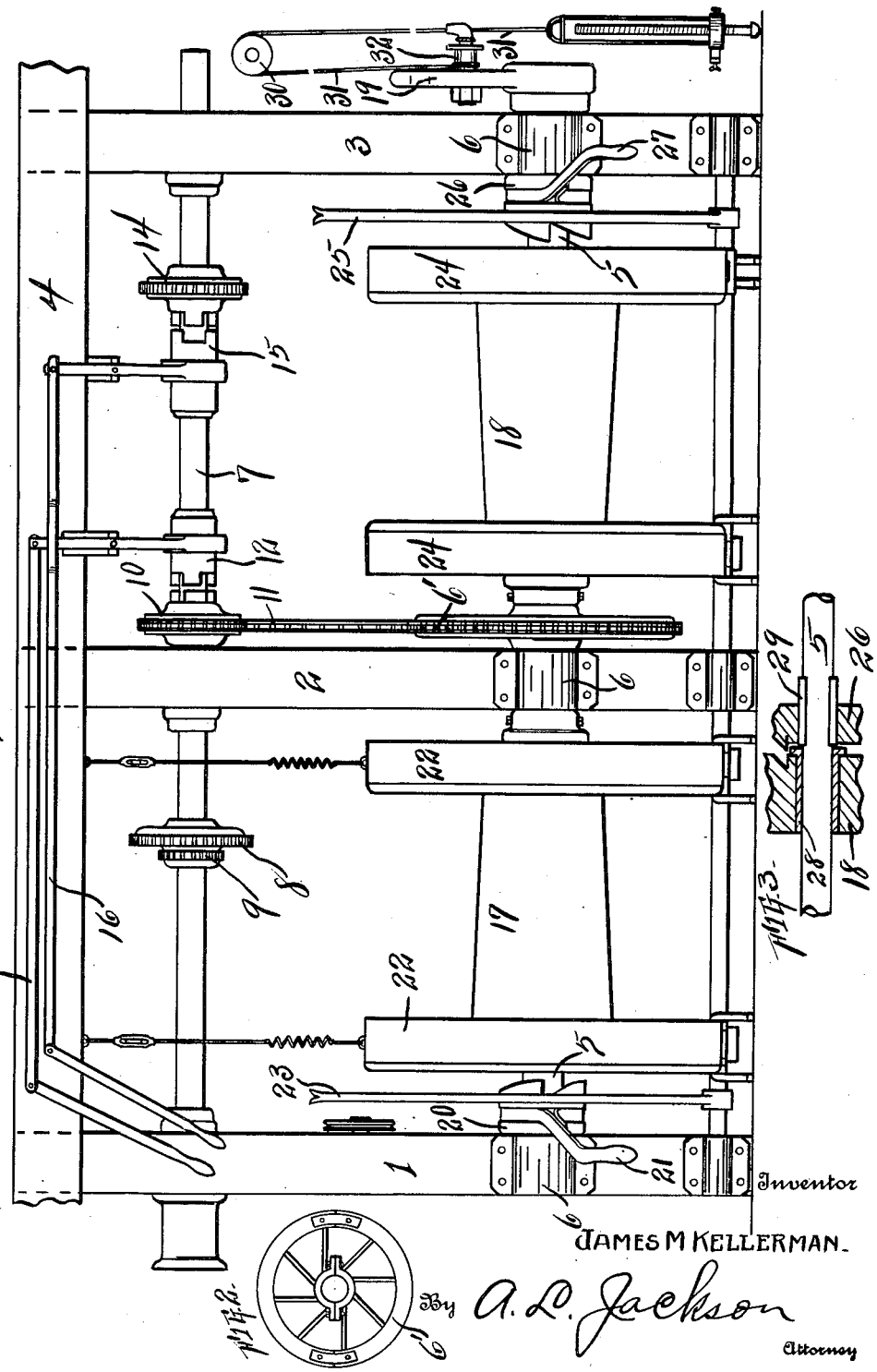

1,450,743

UNITED STATES PATENT OFFICE.

JAMES M. KELLERMAN, OF LOS ANGELES, CALIFORNIA.

DRAW WORKS FOR STANDARD AND ROTARY DRILLING OPERATIONS.

Application filed February 18, 1922. Serial No. 537,636.

*To all whom it may concern:*

Be it known that I, JAMES M. KELLERMAN, a citizen of the United States of America, residing at Los Angeles, in the county of Los Angeles and State of California, have invented certain new and useful Improvements in Draw Works for Standard and Rotary Drilling Operations, as set forth in the annexed specification.

My invention relates to draw-works for well drilling and more particularly to draw-works which are adapted both for standard drilling and also for rotary drilling; and the object is to provide, in one apparatus, draw-works which are adapted for use either in standard drilling equipment or rotary drilling equipment and by combining the two features in one apparatus, the cost is much less than providing two separate equipments. Other objects and advantages will be fully explained in the following description and the invention will be more particularly pointed out in the claims.

Reference is had to the accompanying drawings which form a part of this application.

Fig. 1 is a diagrammatic side elevation of the apparatus. Fig. 2 is a detail view of a detachable drive wheel. Fig. 3 is a section of a boxing for the drums on the main shaft.

Similar characters of reference are used to indicate the same parts throughout the several views.

The operating apparatus is mounted in a frame composed of uprights 1, 2, and 3 which are bolted to a beam 4. At the bottom the uprights 1, 2, and 3 are attached to the derrick floor and the beam 4 is attached to the derrick. The main drive shaft 5 is mounted on the uprights 1, 2, and 3 by means of bearings 6 which are bolted to the uprights. The main drive shaft 5 is driven by a sprocket wheel 6'. The wheel 6' is made in two sections, as shown in Fig. 2, so that different wheels may be mounted on the shaft 5, as when more power is required, a larger wheel may be used. The wheel 6' is driven from a line shaft 7 which is provided with suitable bearings attached to the uprights 1, 2, and 3. The shaft 7 is driven from an engine or motor to which is geared one of the wheels 8 or 9. A sprocket wheel 10 on shaft 7 drives a sprocket chain 11 which drives wheel 6'. The wheel 10 runs loose on the shaft 7 and is geared thereto for driving purposes by a clutch 12 which is thrown in and out of mesh with the wheel 7 by suitable levers 13. A wheel 14 is loosely mounted on the shaft 7 for driving the rotary table (not shown) and this wheel is geared to the shaft 7 by a clutch 15 which is operated by suitable levers 16.

The main shaft 5 drives drums 17, and 18 and a crank 19. The drum 17 is used for pulling the drill stem from the well or to operate the sand pump. The drum 17 runs loose on the shaft 5 and is geared thereto for operation by a clutch 20 which is actuated by a lever 21. The drum 17 is tapered for the purpose of making the lines run true. The drum 17 is provided with the usual brake straps 22 and lever 23 for operating the straps.

The drum 18 is for the purpose of hoisting the drilling tools and this drum is also tapered to make the drill line run true. The drum 18 is provided with the usual brake straps 24 and lever 25 for operating the brake straps and this drum is thrown in an operative relation by means of the clutch 26 and lever 27. The drums 17 and 18 are provided with bronze bushings 28 which are flanged on the ends. The keys 29 are embedded partly in the shaft 5 and partly in the clutches and the ends of the keys 29 bear against shoulders in the shaft 5 so that the keys will be held stationary and the other ends of the keys come against the bushings 28 so that the bushings will be held in place in the drums. This will prevent axial movement of the drums on the shaft 5.

A crank 19 is rigid with the shaft 5. Instead of operating a walking beam, as in standard drilling operations, the crank 19 is used to operate a line 31 which runs over a pulley 30 located at some point in a derrick and then connected to a temper screw at the other end, the temper screw being the usual temper screw for operating a drill line. The line 31 is connected to the wrist pin 32 of the crank 19.

The crank 19 may also be used on the counter-shaft 7 and on any rotary rig equipment for drilling shallow wells or cleaning out wells.

What I claim, is,—

1. A draw works for standard and rotary drilling operations comprising a frame, a drive shaft journaled on said frame, a line shaft and gearing for driving said drive shaft from said line shaft, drums loosely mounted on said drive shaft, clutches for making said drums rigid with said drive shaft, and an operating crank rigid with said drive shaft.

2. A draw works for standard and rotary drilling operations comprising a frame, a drive shaft journaled on said frame, a line shaft and gearing for driving said drive shaft from said line shaft, tapered drums loosely mounted on said drive shaft, clutches for making said drums rigid with said drive shaft, and a crank rigid with said drive shaft for transmitting the power of said drive shaft to drilling devices.

3. A draw works for standard and rotary drilling operations comprising a frame, a drive shaft journaled on said frame, a line shaft and gearing for driving said drive shaft from said line shaft, drums for selective use loosely mounted on said drive shaft, clutches for making said drums rigid with said drive shaft, and an operating crank rigid with said drive shaft for transmitting the power of said drive shaft to drilling implements.

4. A draw works for standard and rotary drilling operations comprising a frame, a drive shaft journaled on said frame, a line shaft and gearing for driving said drive shaft from said line shaft, drums for selective use loosely mounted on said drive shaft, clutches for making said drums rigid with said drive shaft, bushings for preventing axial movement of said drums on said shaft, keys for said clutches embedded partly in said drive shaft for said clutches and serving to hold said bushings against axial movement, and an operating crank rigid with said drive shaft for transmitting the power of said shaft to drilling implements.

5. A draw works for standard and rotary drilling operations comprising a frame, a drive shaft journaled on said frame, a line shaft and gearing for driving said drive shaft from said line shaft and gearing for selective use for driving a rotary table from said line shaft, drums for selective use loosely mounted on said drive shaft, clutches for making said drums rigid with said drive shaft, and an operating crank rigid with said drive shaft for transmitting the power of said drive shaft to drilling implements.

6. A draw works for standard and rotary drilling operations comprising a frame, a drive shaft journaled on said frame, a power wheel in two parts detachably connected mounted on said drive shaft, gearing for driving said power wheel, a line shaft for driving the said gearing, drums loosely mounted on said drive shaft, clutches for making said drums rigid on said drive shaft, and an operating crank rigid with said drive shaft for transmitting the power of said drive shaft to drilling implements.

In testimony whereof, I set my hand, this 15th day of February, 1922.

JAMES M. KELLERMAN.